US 9,686,309 B2

(12) United States Patent
Wang et al.

(10) Patent No.: US 9,686,309 B2
(45) Date of Patent: *Jun. 20, 2017

(54) LOGGING ATTACK CONTEXT DATA

(71) Applicant: Fortinet, Inc., Sunnyvale, CA (US)

(72) Inventors: Wei David Wang, North Vancouver (CA); Dayong Zhou, Burnaby (CA); Ihab Khalil, Port Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/637,067

(22) Filed: Mar. 3, 2015

(65) Prior Publication Data
US 2015/0180887 A1   Jun. 25, 2015

Related U.S. Application Data

(63) Continuation of application No. 14/155,008, filed on Jan. 14, 2014, which is a continuation of application No. 13/950,252, filed on Jul. 24, 2013.

(51) Int. Cl.
*H04L 29/06* (2006.01)

(52) U.S. Cl.
CPC ........ *H04L 63/145* (2013.01); *H04L 63/0254* (2013.01); *H04L 63/14* (2013.01); *H04L 63/1425* (2013.01)

(58) Field of Classification Search
None
See application file for complete search history.

(56) References Cited

U.S. PATENT DOCUMENTS

| 6,453,345 B2 | 9/2002 | Trcka et al. |
| 6,971,028 B1* | 11/2005 | Lyle ............... G06F 21/554 709/224 |
| 7,149,189 B2 | 12/2006 | Huntington et al. |

(Continued)

OTHER PUBLICATIONS

Final Rejection for U.S. Appl. No. 13/950,252 mailed Apr. 28, 2015.
(Continued)

*Primary Examiner* — Trang Doan
(74) *Attorney, Agent, or Firm* — Hamilton, DeSanctis & Cha LLP (57) ABSTRACT

Methods and systems for improved attack context data logging are provided. According to one embodiment, configuration information is received from an administrator of a network security device. The configuration information includes information indicative of a quantity of packets to be captured for post attack analysis. Responsive to receipt of the configuration information, a size of a circular buffer is configured based thereon. Multiple packets directed to a network protected by the network security device are received from an external network. The received packets are temporarily buffered within the circular buffer. An analysis is performed to determine whether one of the received packets is potentially associated with a threat or undesired activity ("trigger packet"). Responsive to an affirmative determination, contextual information is captured by extracting information regarding at least a portion of the configured quantity of packets from the circular buffer and storing the contextual information within a log.

14 Claims, 6 Drawing Sheets

(56) References Cited

U.S. PATENT DOCUMENTS

| | | | |
|---|---|---|---|
| 7,523,499 B2* | 4/2009 | Wilkins | H04L 63/083 |
| | | | 713/183 |
| 7,716,737 B2 | 5/2010 | Wilken et al. | |
| 2003/0051026 A1 | 3/2003 | Carter et al. | |
| 2003/0159069 A1 | 8/2003 | Choi et al. | |
| 2005/0071445 A1 | 3/2005 | Siorek et al. | |
| 2005/0210533 A1 | 9/2005 | Copeland et al. | |
| 2005/0216955 A1 | 9/2005 | Wilkins et al. | |
| 2006/0031928 A1 | 2/2006 | Conley et al. | |
| 2006/0067231 A1 | 3/2006 | Ikoma et al. | |
| 2006/0095968 A1 | 5/2006 | Portolani et al. | |
| 2006/0236391 A1* | 10/2006 | Kim | H04L 63/1466 |
| | | | 726/22 |
| 2007/0050846 A1* | 3/2007 | Xie | H04L 63/1425 |
| | | | 726/22 |
| 2008/0276313 A1 | 11/2008 | Kummu et al. | |
| 2009/0319659 A1* | 12/2009 | Terasaki | H04L 63/1416 |
| | | | 709/224 |
| 2010/0031093 A1* | 2/2010 | Sun | G06F 21/552 |
| | | | 714/45 |
| 2012/0140630 A1 | 6/2012 | McGrath et al. | |
| 2015/0033322 A1 | 1/2015 | Wang et al. | |
| 2015/0033336 A1 | 1/2015 | Wang et al. | |

OTHER PUBLICATIONS

Non-Final Rejection for U.S. Appl. No. 13/950,252 mailed Dec. 1, 2014.
Non-Final Rejection for U.S. Appl. No. 14/155,008 mailed Mar. 28, 2014.
Final Rejection for U.S. Appl. No. 14/155,008 mailed Oct. 31, 2014.
Appeal Brief for U.S. Appl. No. 14/155,008, filed Jan. 14, 2015.
Examiner's Answer to Appeal Brief for U.S. Appl. No. 14/155,008 mailed May 22, 2015.
Appeal Brief for U.S. Appl. No. 13/950,252, filed Aug. 5, 2015.
Examiner's Answer to Appeal Brief for U.S. Appl. No. 13/950,252 mailed Nov. 19, 2015.

* cited by examiner

LOGGING ATTACK CONTEXT DATA

CROSS-REFERENCE TO RELATED APPLICATIONS

This application is a continuation of U.S. patent application Ser. No. 14/155,008, filed Jan. 14, 2014, which is a continuation of U.S. patent application Ser. No. 13/950,252, filed Jul. 24, 2013, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2013-2015, Fortinet, Inc.

BACKGROUND

Field

Embodiments of the present invention generally relate to the field of computer networks. In particular, various embodiments relate to methods and systems for logging data to facilitate capturing and understanding of the context of an attack.

Description of the Related Art

Networked computers represent significant targets of opportunity for both recreational and malicious hackers, viruses, worms, scripted attacks, etc. Hacks and hackers have different levels of sophistication and gain access in cases of successful hacks to a computer through its network interface when the interface is coupled to the Internet. Computers supporting Internet Protocol (IP) and other IP network nodes are identified by their IP address, wherein each network interface can support up to several thousand ports. To help manage security of a given network interface, a firewall may be employed for processing data arriving at individual ports. Some ports, such as ports commonly used for HTTP protocol support, may be assigned or opened to allow traffic to pass through to a corresponding service, for example, running on a web server, which is configured to manage HTTP traffic. The firewall may close all other ports to restrict outside traffic from gaining access to the network.

A computer network typically includes a collection of interconnected computing devices that exchange data and share resources. Such devices may include, for example, web servers, database servers, and file servers, routers, printers, end-user computers and other devices. Such a variety of devices may execute a myriad of different services and communication protocols, wherein each such service or communication protocol can expose the network to different security attacks.

Firewalls and intrusion detection systems are devices that are used to protect a computer network from unauthorized or disruptive users. A firewall can be used to secure a local area network (LAN) from users outside the network by checking, routing, and frequently labeling messages sent to or from users outside the network. An intrusion detection system (IDS) can be used to recognize suspicious patterns of behavior in a communication system, wherein examples of intrusion detection systems can include network intrusion detection system (NIDS) and a host intrusion detection system (HIDS). A NIDS can be used to examine information being communicated within a network to recognize suspicious patterns of behavior, wherein HIDS can be used to examine information being communicated through a particular host computer within a network to recognize suspicious patterns of behavior. Information obtained by an IDS can be used to block unauthorized or disruptive users from accessing the network.

With the development of network technologies and applications, network attacks are greatly increasing both in number and severity. Being a key technique in network security domain, Intrusion Prevention Systems (IPSs) play a vital role of detecting various kinds of attacks and securing the networks from such detected attacks. Another purpose of an IPS is to log evidence of intrusions within normal audit data. IPS is an effective security technology, which can detect, prevent and possibly react to an attack, wherein the IPS performs monitoring of activities by target sources and employs various techniques for providing security services. An IPS may also gather evidence of an attacker's activity, remove the attacker's access to the network and reconfigure the network to resist the attacker's penetration technique and/or subsequent network access by the attacker.

Generally, firewalls, intrusion detection systems, or specific packet analyzers create log records across one or more sessions (source-destination interactions) that record information regarding packets associated with such sessions, wherein the log records can include details of requested or sent packets such as source IP, destination IP, timestamp, destination port and other details. Analysis of such packets, at run time, can help intrusion detection systems or other such tools in assessing whether the packet is an attack packet. To assist with post attack analysis, some existing intrusion detection systems log one or more packets once an intrusion is detected; however, merely logging one or more packets received after the attack has been detected is not typically sufficient to aid those performing post-attack analysis in understanding the complete context of the attack.

SUMMARY

Methods and systems are described for improved attack context data logging. According to one embodiment, configuration information is received from an administrative user of a network security device. The configuration information includes information indicative of a quantity of packets to be captured by the network security device for purposes of performing a post attack analysis. Responsive to receipt of the configuration information, a size of a circular buffer within a memory of the network security device is configured based on the configuration information. Multiple packets directed to a private network protected by the network security device are received from a source outside of the private network. The received packets are temporarily buffered, by the network security device, within the circular buffer. It is determined, by the network security device, whether a packet of the received packets is potentially associated with a threat or undesired activity ("trigger packet") by analyzing the received packets. Responsive to an affirmative determination, contextual information associated with the threat or undesired activity is captured by the network security device by extracting information regarding at least a portion of the configured quantity of packets from the circular buffer and storing the contextual information within a log to facilitate the post attack analysis.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Embodiments of the present invention generally relate to methods and systems provided for preventing attacks in a network by logging packets before and/or after detection of an attack, which may facilitate understanding of the context of the attack and allow preemptive action to be taken. In one aspect, the system of the present invention may be configured to store a predetermined or configurable quantity (e.g., defined in terms of a specific number of packets or defined in terms of a timeframe) of packets across one or more sessions in a buffer such that once an attack packet is detected, packets present in the buffer can be retrieved and analyzed along with the packet that triggered the detection and/or a predetermined or configurable quantity of packets received after detection of the attack packets so as to understand the context of the attack.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of detecting and preventing network attacks, it should be appreciated that the same has been done merely to illustrate the invention in an exemplary manner and any other purpose or function for which the explained structure or configuration can be used, is covered within the scope of the present disclosure.

Figure 1:
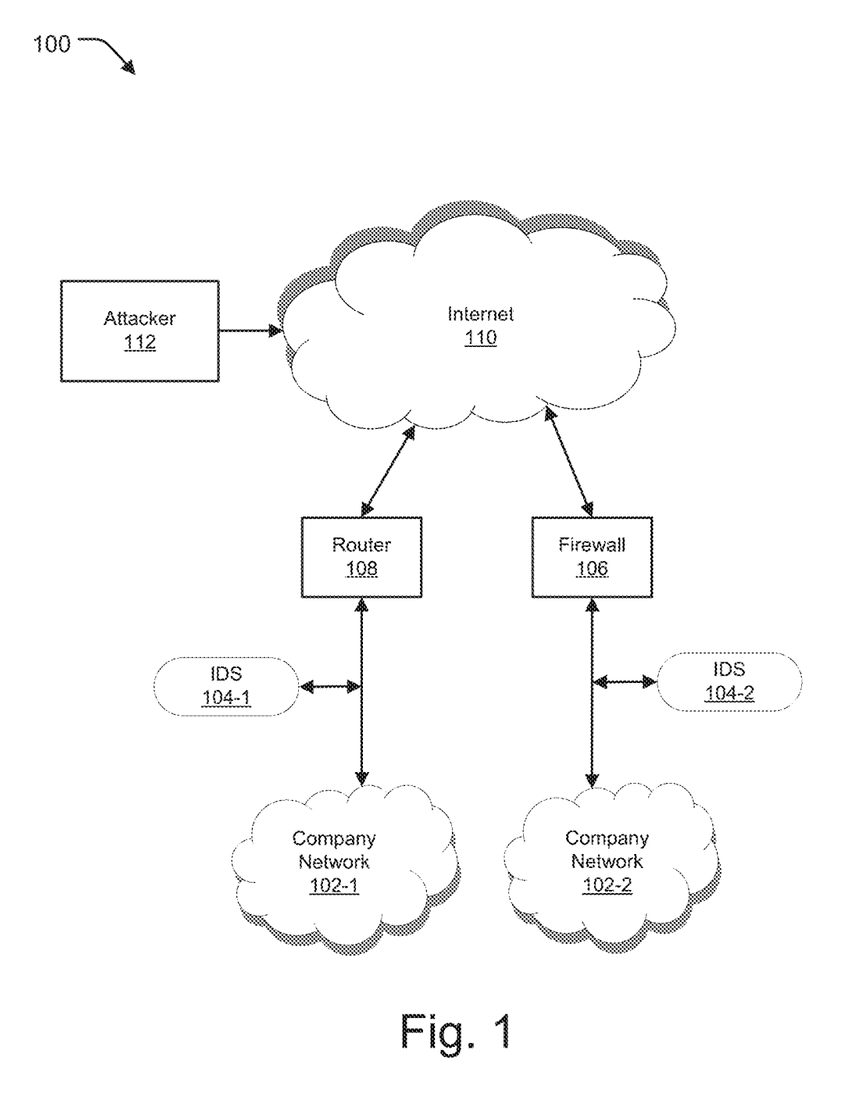
FIG. 1 illustrates an exemplary architecture of a network intrusion detection system in accordance with an embodiment of the present invention.

Embodiments of present disclosure and their advantages are best understood by reference to FIG. 1. FIG. 1 illustrates an exemplary network architecture 100 conceptually showing a network environment in which one or more Intrusion Detection Systems (IDSs), alternatively also referred to as Intrusion Prevention Systems (IPSs), operate. As shown in FIG. 1, network architecture 100 comprises one or more company networks 102-1, 102-2, . . . , 102-n, collectively referred to as company network(s) 102 hereinafter. Network architecture 100 further comprises a router 108 operatively coupled to company network 102-1 and a firewall 106 operatively coupled with company network 102-2, wherein the router 108 and firewall 106 enable access to Internet 110. In an embodiment, each company network 102 can include one or more computing devices such as Computers, Laptops, Smart-Devices, Tablet PCs, among other such devices that are operatively coupled to each other through a Local Area Network (LAN), wherein the LAN is then operatively coupled with one or more networking devices such as routers, switches, hubs, gateways, among other such devices that enable access to Internet 110.

According to one embodiment, a firewall 106 separates the external computing environment, represented by Internet 110 from the internal computing environment associated with company network 102. A firewall 106 can be coupled with one or more network devices to enable efficient routing and access to Internet 110. An attacker 112 may attempt to inflict damage upon protected equipment or data/content stored therein by sending attack packets to computing devices, web servers, among other such IT equipment that form part of the network 102 using Internet 110 as a means. Such an attacker 112 may use platforms, such as denial of service (DoS) attacks, bandwidth attacks, connectivity attacks, distributed denial of service (DDoS) attacks, targeted common gateway interface (CGI) attacks, HTTP-based attacks, malicious packets, worms such as the W32.SQLExp.Worm, WWW attacks, reconnaissance activity, and so forth, all of which are generically referred to as "network anomalies" or "attacks" herein for descriptive convenience. Attacker 112 may issue such attacks or introduce such network anomalies through attack or malicious packets using Internet 110. Therefore, it is desirable to accurately separate and distinguish among legitimate packets and attack packets.

According to one embodiment, architecture 100 further comprises IDS 104-1 operatively coupled with company network 102-1, and IDS 104-2 operatively coupled with company network 102-2, wherein IDS 104 is configured to monitor packets flowing into or out of company network 102 and accordingly detect the presence of network anomalies by observing malicious traffic incoming to, or originating from the protected company network 102. Responsive to the output of the IDS 104, the company network 102 can take appropriate measures to handle the packet such as either to suspend the packet, block the malicious attack packet, or allow the packet. The purpose of IDS 104 therefore is to distinguish among legitimate packets and those potentially representing part of an attack and provide a mechanism for detection of security violations either in real time or batch mode, wherein the voilations are initiated either by outsiders attempting to break into a system or by insiders attempting to misuse their privileges. Other major functions performed by IDS 104 can include monitoring and analyzing user and system activities, assessing the integrity of critical system or data files, recognizing activity patterns reflecting known attacks, responding automatically to detected activity, and reporting results of the detection process in which a log can be created relating to perceived attack packets to facilitate analysis and prevention of future intrusions, attacks and/or false positives.

According to one embodiment, IDS 104 is configured to log incoming and outgoing packets or subset of information contained therein in a buffer of a defined and configurable size, wherein for each packet, if the IDS 104 assesses the packet to be legitimate, the packet (or relevant portion(s) thereof) is stored in the buffer (e.g., a circular buffer). IDS 104 can further be configured such that once it determines a packet to be a potential or known attack packet (e.g., a packet that matches one or more attack detection algorithms implemented by IDS 104), IDS 104 retreives a predetermined or configurable number of previously buffered packets and prepares a log based on the retrieved packets and the potential or known attack packets. The IDS may also log a predetermined or configurable number of packets received after the potential or known attack packet, thereby capturing context both before and after the potential or known attack packet. In this manner, a complete attack context is sought to be provided to facilitate subsequent analysis. This complete attack context is thought to assist in understanding the context of the attack, which otherwise is not possible by mere assessment of the attack packets alone. In an embodiment, packets received by IDS 104 after detection of a potential or known attack packet can also be logged into the same or another buffer and used during preparation of the log. Assessment of the log can further help in defining and/or implementing signatures (or other attack detection algorithms) that can improve the efficiency and efficacy of preventing and detecting network attacks and/or anomalies.

According to an embodiment, the buffer can be a circular buffer, wherein once the buffer is full, each new packet can replace the oldest packet in the buffer (using first-in-first-out principle). According to another embodiment, each new packet can also be configured to replace the least significant packet, such that when one or more attack packets are received by the IDS 104, only the most important set of packets (having high information content relative to attack context) are retreived from the buffer and used for preparing and analyzing the log. In yet another embodiment, instead of logging each packet in a buffer, only packets that meet a defined condition/rule, or packets received within a defined timeframe, or packets intended for a defined set of computing devices, can be logged in a buffer.

It should be appreciated that terms such as blocking packets and suspending packets are to be interpreted widely as the enforcement of a defensive rule that is defined by the system based on the feedback it receives from IDS 104. Such feedback can include, for example, discarding, logging, or rate limiting traffic from a particular source address or set of source addresses; discarding, logging, or rate limiting traffic to a particular destination address or set of destination addresses; discarding, logging, or rate limiting UDP traffic from the Internet 110 to a particular subnet or set of subnets; discarding, logging, or rate limiting UDP traffic from the Internet 110 to a subnet with a particular UDP destination port or set of UDP destination ports; and so forth, including various combinations of the foregoing.

It is further to be appreciated that FIG. 1 is merely an exemplary illustration of a simplified enterprise network architecture. Alternative network architectures, with additional, fewer and/or different network security appliances will also benefit from the teachings described herein. The present illustration therefore merely presents one instance of how a particular network security appliance (e.g., IDS 104) can be configured within a network 102 to monitor, assess, and define rules for logging ingress and egress packets.

Figure 2:
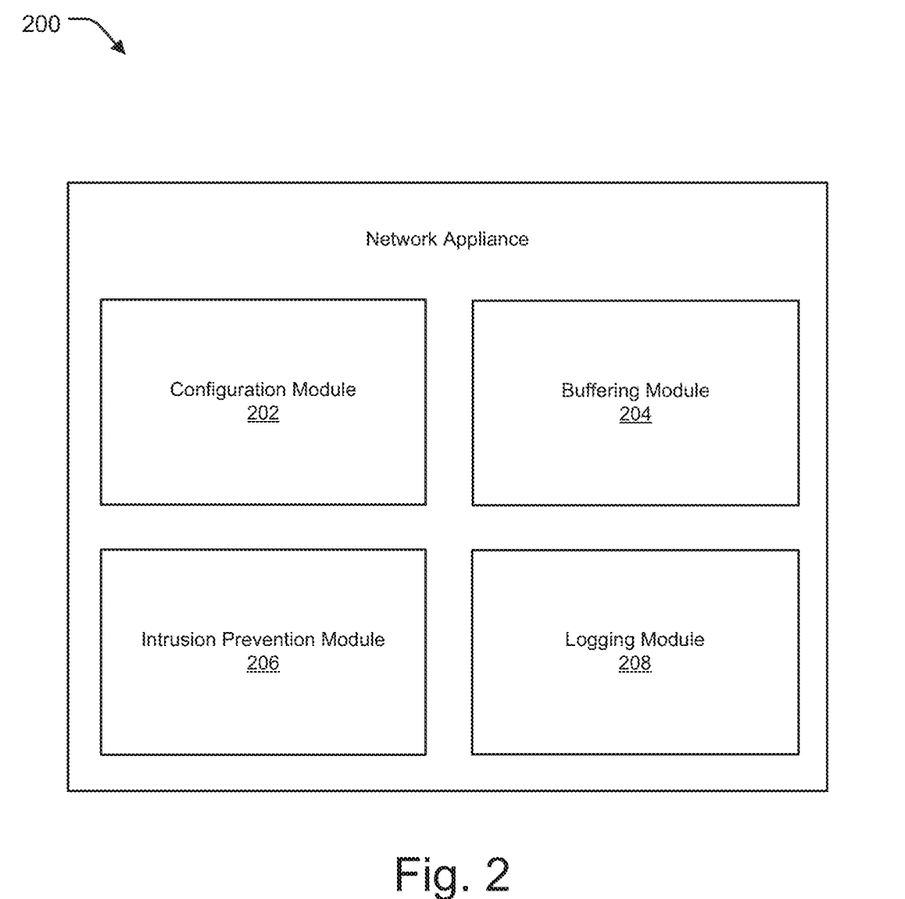
FIG. 2 illustrates exemplary modules of a network intrusion detection system in accordance with an embodiment of the present invention.

FIG. 2 illustrates exemplary modules of a network intrusion detection system 200 in accordance with an embodiment of the present invention. According to one embodiment, network intrusion detection system 200, alternatively also referred to as network intrusion prevention system 200, is implemented in a network appliance and configured to help determine, identify, and understand the context of a network attack along with detecting/preventing network attacks. In an alternate embodiment, network intrusion prevention system 200 can also be implemented separate from the network appliance and operatively coupled thereto to implement analysis of incoming/outgoing network packets and take desired action based on rules/conditions defined therein. According to one embodiment, system 200 of the present invention includes a configuration module 202, a buffering module 204, an intrusion prevention module 206 and a logging module 208.

According to one embodiment, configuration module 202 allows a network administrator to define and structure the number of packets to be logged before and the number of packets to be logged after an attack has been detected, wherein an attack is defined as a sequence of one or more attack/undesired packets. In an instance, configuration module 202 can allow a user to configure "m" packets that are to be logged immediately before a first attack packet is detected and "n" packets that are to be logged immediately after the last attack packet is detected. According to one embodiment, the number of packets to be logged can be predetermined or can be configured in real-time such that only packets of interest are logged instead of all packets. According to another embodiment, configuration module 202 can also be configured to log predetermined or configurable timeframe of packets both before and after detection of an attack packet such that only packets received during a defined timeframe are logged. Similarly, the number and kind of packets to be logged can be defined by the configuration module 202 to enable efficient and desired logging.

According to another embodiment, configuration module 202 is operatively coupled to one or more databases. In an exemplary embodiment, a database can be configured to store one or more signatures that use different techniques to detect attack packets. New and modified signatures (based on analysis of context data relating to prior attacks) can also be stored in the database. Databases can also be operatively coupled with other functional modules for efficient storage of data/content such as log files, as will be explained in the description hereinafter. According to another embodiment, an attack anomaly database can also be incorporated within system 200 and configured to be coupled and controlled by configuration module 202 such that the anomaly database stores data corresponding to attack packets in the form of, say a table such as a hash table. Anomaly database can be scanned to study deviations from normal behavior indicating potential attack packets, which can then be applied to reduce false-positive alerts consists in using contextual information on the infrastructure (e.g. network topology, known existing attacks) to determine if the attack has some chances to be successful and figures a real intrusion possibility.

According to an embodiment, configuration module 202 can also be configured to determine the duration for which the packets are to be logged. Furthermore, configuration module 202 can also be designed to identify the maximum number of bytes that are to be logged. Similarly, many other settings can be made by the module 202 to help system 200 analyze the context of a network attack and define signatures to prevent future network attacks.

It should be appreciated that the above disclosure merely mentions exemplary illustrations of the data/content that one or more databases can store, and that any other information can always be configured to be stored in the one or more databases and all such variations are completely within the scope of the present invention. According to one embodiment, configuration module 202 can be implemented by means of a graphical user interface that allows a network administrator to define the characteristics of packets that are to be logged through one or more settings options that are present on the interface.

According to an embodiment, intrusion prevention module 206 can be operatively coupled with configuration module 202, buffering module 204, and logging module 208 and is configured to process one or more incoming and outgoing packets to take desired and condition-based actions. In an implementation, intrusion prevention module 206 can be centralized in design by being installed at a choke point of a network, e.g. at a network service provider gateway. Further, module 206 can be operated in a stand-alone mode with centralized applications, which are physically integrated within a single processing unit or a distributed IPS. According to one embodiment, intrusion prevention module 206 can be configured to scan network packets received by a network appliance and send them to the buffering module 204. In an implementation, module 206 can be configured to scan one or more traffic packets based on characteristics of such packets and rules defined in the module 206. Based on the scanning a packet may be determined to be an attack packet.

According to one embodiment, buffering module 204 is configured to define one or more buffers of fixed or configurable size to store one or more packets as and when received from the intrusion prevention module 202. Buffering module 204 can be operatively coupled with configuration module 202 such that the number and kind of packets to be logged, as defined by module 202, are used as the basis to store packets. According to one embodiment, a size of a buffer that is configured to store packets is no more than the number of packets that are defined by the configuration module 202 to be logged, and hence for each new packet that is received after the defined number of packets have been logged, the oldest logged packet can be overwritten. According to another embodiment, buffering module 204 can configure a buffer in real-time such that the size of the buffer is the same as the number of packets that are defined to be logged by the configuration module 202.

According to one embodiment, one or more buffers defined by the buffering module 204 are circular buffers such that once the buffer is full; each new packet replaces the oldest packet in the buffer. According to another embodiment, each packet can be stored along with its priority, which is evaluated by intrusion prevention module 206 such that any new packet that arrives when the buffer is full, can replace the packet having a lowest priority. According to another embodiment, instead of storing the complete packet, only a subset of information from each packet is stored for efficient storage and retrieval of the buffered packets when an attack is detected.

According to another embodiment, one or more buffers defined by buffering module 204 can also be configured to store packets that are received after the attack is detected. In an implementation, packets received before detection of an attack can be stored in a separate buffer from the packets received after detection of the attack. In an alternate implementation, the predetermined or configurable quantity of packets received before detection of the attack can be stored in the same buffer as the predetermined or configurable quantity of packets received after detection of the attack. It should be appreciated that the number and type of packets that are to be buffered after detection of an attack can be different in context, type, and qualifiers from the packets that are to be buffered prior to detection of the attack.

In an implementation, once the intrusion prevention module 206 detects an attack by means of an attack packet, packets stored in one or more buffers of the buffering module 204 can be sent to logging module 208 along with the packet triggering the detection, so as to enable the logging module 208 to create a log using the attack packet and a set of packets received prior to the detection. According to one embodiment, packets logged prior to detection of an attack can be merged with packets logged after detection of the attack to form a log. Such a log can have markers or other like differentiators that can help distinguish attack and legitimate packets. Logs created by logging module 208 can subsequently be sent to a logging system (not shown) to facilitate understanding of the context of the network attack. An administrative user can therefore use the logging system to understand the behavior and/or pattern of the attack and can accordingly take measures to implement and deploy signatures to prevent future attacks\.

It should be appreciated that even though FIG. 2 illustrates implementation of configuration module 202, buffering module 204, intrusion prevention module 206, and logging module 208 in network appliance 200, each of these modules can also be implemented partially within the network appliance 200 and partially outside. For instance, configuration module 202 can be implemented on the administrator's computing device and buffering module 204 can be implemented within a storage device.

Figure 3:
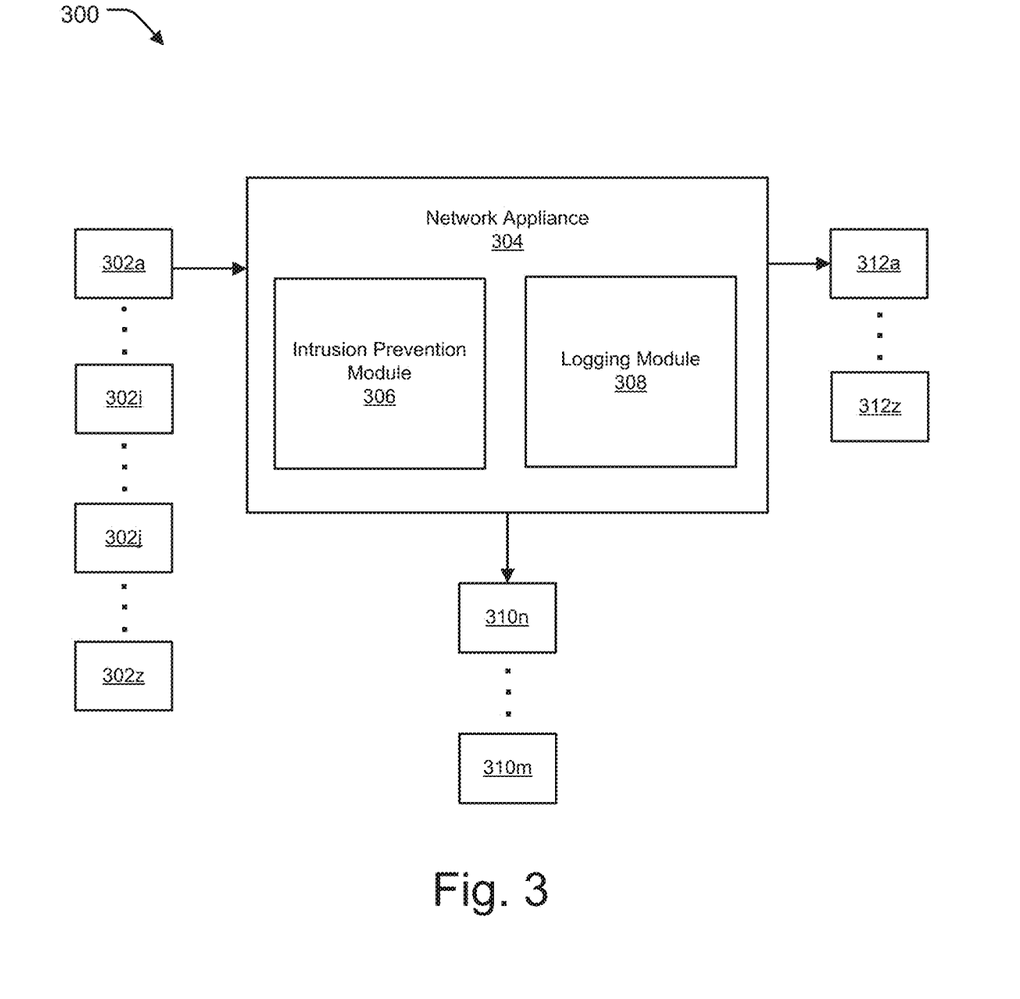
FIG. 3 illustrates ingression and egression of traffic packets into a network appliance in accordance with an embodiment of the present invention.

FIG. 3 illustrates ingression and egression of traffic packets into and out of a network appliance 304 in accordance with an embodiment of the present invention. As shown in exemplary illustration 300, network packets 302a, 302b, . . . , 302i, . . . , 302j, . . . , 302z include ingression/incoming traffic packets, of which one or more can be attack packets. According to one implementation, network appliance 304 comprises intrusion prevention module 306 and logging module 308. Intrusion prevention module 306 can be configured to analyze incoming packets 302 for whether they are legitimate packets or attack packets. In an implementation, intrusion prevention module 306 is configured to allow buffering of a first set of packets prior to detecting an attack packet and buffering of a second set of packets once the attack detection has been triggered, using one or more buffers. For instance, in FIG. 3, packets 302i-302j can correspond to attack packets and therefore intrusion prevention module 306 can be configured to buffer packets 302a until the packet prior to 302i, and further configured to buffer some subset of packets 302j-302z. It should be appreciated that instead of all of the predetermined or configurable quantity of packets received prior to or after detection of an attack, a subset of such packets can also be buffered based on conditions defined by the intrusion prevention module 306.

According to an embodiment, logging module 308 is configured to take the packet triggering the detection and the buffered packets as input and generate a log of packets, which when analyzed can facilitate understanding of the context of the network attack and help define better and/or more efficient signatures. In an instance, as illustrated in FIG. 3, the log of packets can be represented as 310n . . . 310m. Such a log can then be sent to a logging system for further analysis of attack context and stored in a defined memory location.

According to another embodiment, one or more network packets 312a . . . 312z can be issued and transmitted to intended destination addresses based on rules/conditions defined by intrusion prevention module 306. Such rules can be defined so as to reduce the number of false-positives and help deliver all legitimate packets and block attack and/or undesired packets. In an instance, in case all attack packets 302i-302j are found by the intrusion prevention module 306 to be undesired, only legitimate buffered packets are sent to the intended recipients.

Figure 4:
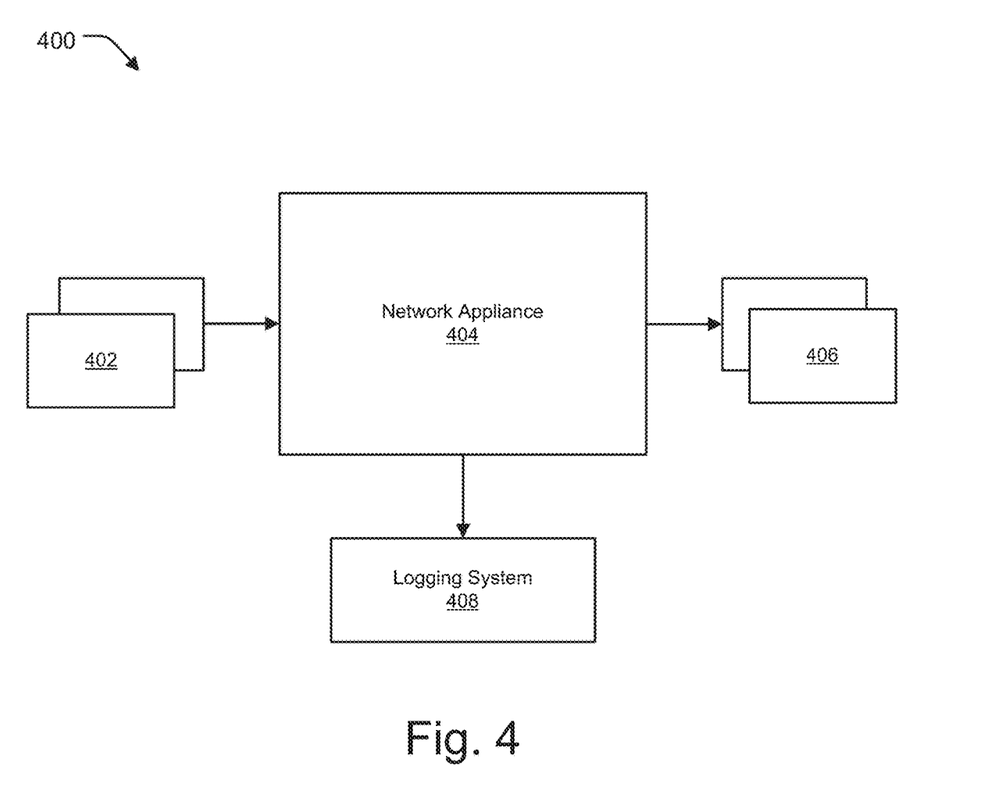
FIG. 4 illustrates an exemplary network appliance sending a log to a logging system in accordance with an embodiment of the present invention.

FIG. 4 illustrates network appliance 404 sending a log comprising both attack and legitimate packets to a logging system 408 in accordance with an embodiment of the present invention. As illustrated in FIG. 4, incoming packets 402 are first processed by network appliance 404 to distinguish among legitimate and attack packets and then create a log based on a combination of one or more legitimate packets and attack packets such that the created log can then be sent to a logging system 408 for analysis of the context of the attack. Acceptable packets from the set of incoming packets 402 can be simultaneously or subsequently processed by network appliance 402 to yield output packets 406, which can be sent to intended recipients.

Figure 5:
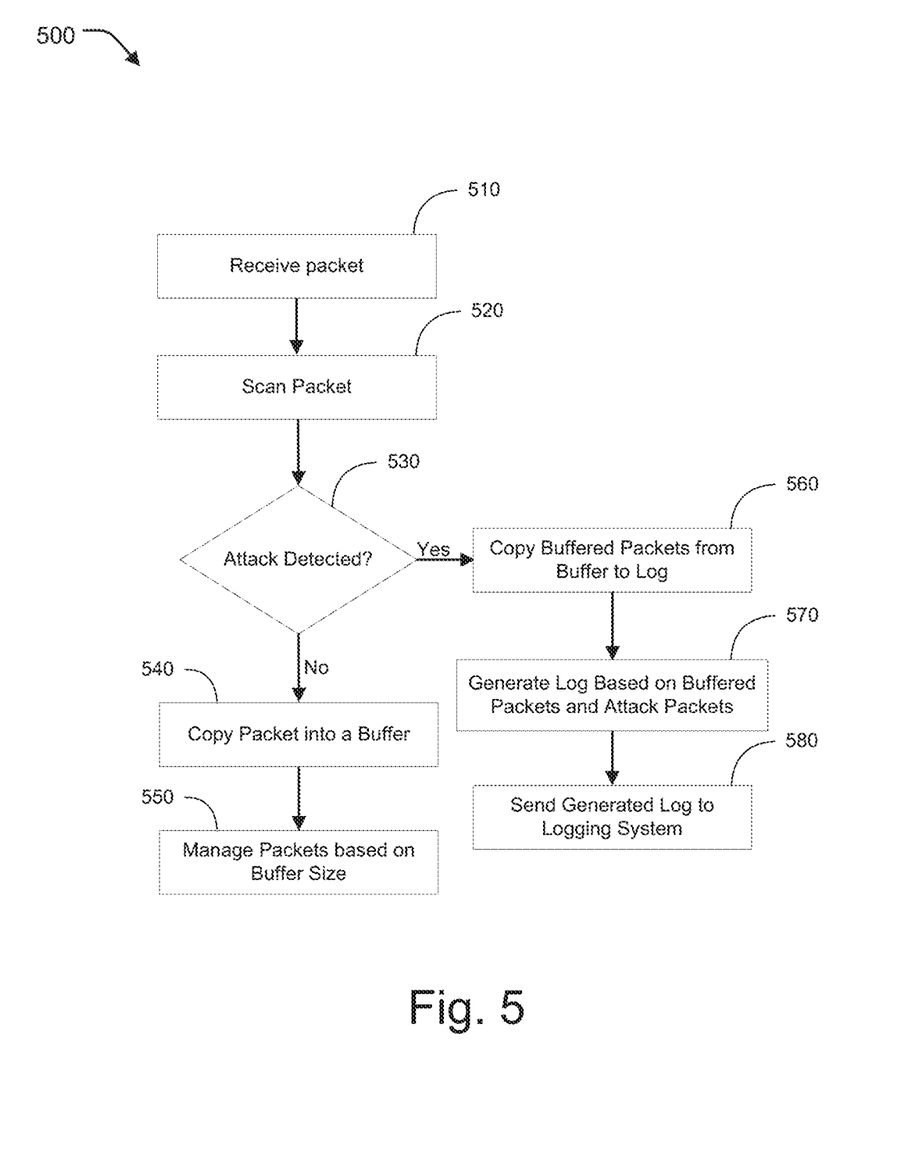
FIG. 5 is a flow diagram illustrating logging of attack context data in accordance with an embodiment of the present invention.

FIG. 5 is a flow diagram 500 illustrating logging of attack context data for determining context of a network attack by logging one or more network packets before and after an attack is detected. According to one embodiment of the present invention, method 500 comprises configuring "m" packets to be logged in a first buffer prior to detection of a network attack and "n" packets to be logged in a second buffer after detection of the network attack, and using such buffered packets along with the attack packet(s) to determine the context of the network attack. It should be appreciated that even though the present method has been described with reference to an instruction prevention module that is implemented in a network appliance or a separate network intrusion detection/prevention system, any other appropriate system and device can be used to implement the steps of the present invention.

At block 510, traffic packets containing one or more legitimate and attack packets are received, wherein the packets are either sent or received by an internal network. At block 520, the received packets are scanned by applying one or more attack detection algorithms. In one embodiment, the attack detection algorithms include one or more of (i) a set of intrusion detection signatures, (ii) a set of malware detection signatures and (iii) a set of network security policy rules.

At decision block 530, based on the results of the scanning performed in block 520 a determination is made regarding whether the packet at issue is an attack packet. At block 540, if the packet at issue is determined to be a legitimate packet (e.g., one that does not trigger an attack detection signature), then the packet is copied into a buffer of defined/configurable size. According to another embodiment, instead of buffering all received packets, a subset of such packets can also be logged into the buffer, wherein the subset can be identified based on one or more of time, content of the packets, information in the header of the packets, session, among other configuration settings that can help determine desired network packets to be buffered. According to yet another embodiment, the buffer can include one or a combination of circular buffer, disk buffer, frame buffer, depth buffer, stencil buffer, variable length buffer, scale buffer, write buffer, among other like buffers.

At block 550, one or more buffered packets are managed based on one or more of size of buffer, configuration of number and kind of packets to be buffered, overwriting mechanism, among other buffer management settings/configurations.

At block 560, once an attack packet is detected, by the intrusion prevention module, for example, packets stored in the buffer can be retrieved and used along with the attack packet or a group thereof to form a log.

At block 570, a log is generated based on the buffered packets, the packet that triggered the detection and/or a predetermined or configurable quantity of packets received after the detection. Such a log can be generated, say by the logging module of the proposed system, based on settings defined by the module, wherein in an exemplary embodiment, the log can be generated by simply appending pre-attack detection legitimate packets, the attack packet and post-attack detection packets in accordance with their timestamps.

At block 580, the generated log is sent to a logging system, wherein the logging system analyzes the log to determine the context of the network attack.

Figure 6:
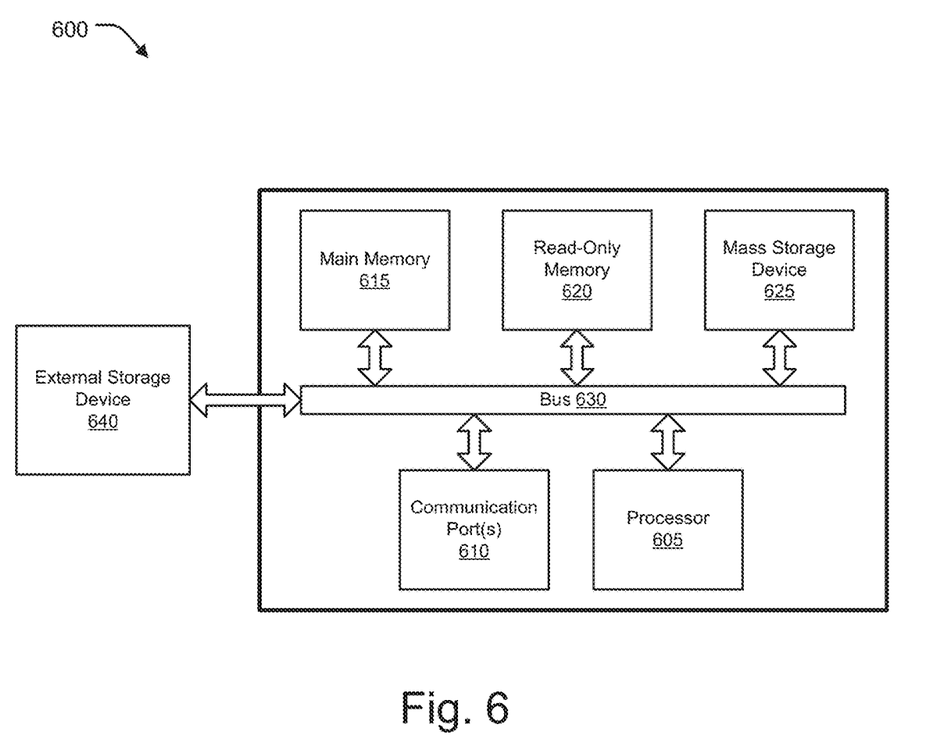
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a network device (e.g., firewall 106, IDS 104-1 or 104-2 or other network security gateway or appliance), a server, an administrative console or computer system or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Xeon® or Itanium® processor(s), or AMD® Opteron® or Athlon MP® processor(s), Motorola® lines of processors, FortiSOC™ system on a chip processors or other future processors. Processor 605 may include various modules associated with network appliance 200 as described with reference to FIG. 2. For example, processor 605 may include one or more of configuration module 202, buffering module 204, intrusion prevention module 206 and logging module 208.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
receiving, by a network security device operable to protect a private network, configuration information from an administrative user of the network security device, the configuration information including information indicative of a quantity of packets to be captured by the network security device for purposes of performing a post attack analysis;
responsive to receipt of the configuration information, configuring, by the network security device, a size of a circular buffer within a memory of the network security device based on the configuration information;
receiving, by the network security device, a plurality of packets directed to the private network from a source outside of the private network;
temporarily buffering, by the network security device, the plurality of received packets within the circular buffer;
determining, by the network security device, whether a packet of the plurality of received packets is potentially associated with a threat or undesired activity ("trigger packet") by analyzing the plurality of received packets;
responsive to an affirmative determination, capturing, by the network security device, contextual information associated with the threat or undesired activity by extracting information regarding at least a portion of the configured quantity of packets from the circular buffer and storing the contextual information within a log to facilitate the post attack analysis; and
wherein the quantity of packets is defined in terms of a number of packets, and wherein a first subset of the quantity of packets comprises one or more packets of the plurality of received packets that were received by the network security device prior to the trigger packet and provides context prior to the trigger packet and a second subset of the quantity of packets comprises one or more packets of the plurality of received packets that were received by the network security device after the trigger packet and provides context after the trigger packet.

2. The method of claim 1, wherein said determining, by the network security device, whether any of the plurality of received packet are potentially associated with a threat or undesired activity comprises applying, by the network security device, at least one attack detection algorithm to the plurality of received packets.

3. The method of claim 2, wherein the at least one attack detection algorithm comprises one or more of a set of intrusion detection signatures, a set of malware detection signatures and a set of security policies.

4. The method of claim 1, wherein the configuration information includes information indicative of one or more types of packets to be logged and wherein storing the contextual information within a log to facilitate the post attack analysis comprises filtering one or more of the plurality of received packets temporarily buffered within the circular buffer based on the information indicative of one or more types of packets to be logged.

5. The method of claim 1, wherein the contextual information includes packet headers of one or more of the plurality of received packets temporarily buffered within the circular buffer.

6. The method of claim 1, wherein the contextual information includes entire contents of one or more of the plurality of received packets temporarily buffered within the circular buffer.

7. The method of claim 1, wherein the contextual information includes information associated with packets spanning multiple sessions.

8. A non-transitory computer-readable storage medium embodying a set of instructions, which when executed by one or more processors of a network security device, cause the one or more processors to perform a method comprising:
   receiving configuration information from an administrative user of the network security device, the configuration information including information indicative of a quantity of packets to be captured by the network security device for purposes of performing a post attack analysis;
   responsive to receipt of the configuration information, configuring a size of a circular buffer within a memory of the network security device based on the configuration information;
   receiving a plurality of packets directed to a private network protected by the network security device from a source outside of the private network;
   temporarily buffering the plurality of received packets within the circular buffer;
   determining whether a packet of the plurality of received packets is potentially associated with a threat or undesired activity ("trigger packet") by analyzing the plurality of received packets;
   responsive to an affirmative determination, capturing contextual information associated with the threat or undesired activity by extracting information regarding at least a portion of the configured quantity of packets from the circular buffer and storing the contextual information within a log to facilitate the post attack analysis; and
   wherein the quantity of packets is defined in terms of a number of packets, and wherein a first subset of the quantity of packets comprises one or more packets of the plurality of received packets that were received by the network security device prior to the trigger packet and provides context prior to the trigger packet and a second subset of the quantity of packets comprises one or more packets of the plurality of received packets that were received by the network security device after the trigger packet and provides context after the trigger packet.

9. The non-transitory computer-readable storage medium of claim 8, wherein said determining whether any of the plurality of received packet are potentially associated with a threat or undesired activity comprises applying at least one attack detection algorithm to the plurality of received packets.

10. The non-transitory computer-readable storage medium of claim 9, wherein the at least one attack detection algorithm comprises one or more of a set of intrusion detection signatures, a set of malware detection signatures and a set of security policies.

11. The non-transitory computer-readable storage medium of claim 8, wherein the configuration information includes information indicative of one or more types of packets to be logged and wherein storing the contextual information within a log to facilitate the post attack analysis comprises filtering one or more of the plurality of received packets temporarily buffered within the circular buffer based on the information indicative of one or more types of packets to be logged.

12. The non-transitory computer-readable storage medium of claim 8, wherein the contextual information includes packet headers of one or more of the plurality of received packets temporarily buffered within the circular buffer.

13. The non-transitory computer-readable storage medium of claim 8, wherein the contextual information includes entire contents of one or more of the plurality of received packets temporarily buffered within the circular buffer.

14. The non-transitory computer-readable storage medium of claim 8, wherein the contextual information includes information associated with packets spanning multiple sessions.

* * * * *